(12) United States Patent
Cheng

(10) Patent No.: US 7,431,254 B2
(45) Date of Patent: Oct. 7, 2008

(54) AXLE MECHANISM CAPABLE OF ADJUSTING AN ELEVATION

(75) Inventor: Kang Han Cheng, Sinjhuang (TW)

(73) Assignee: Jarllytec Co., Ltd., Sinjhuang (TW)

( * ) Notice: Subject to any disclaimer, the term of this patent is extended or adjusted under 35 U.S.C. 154(b) by 0 days.

(21) Appl. No.: 11/602,849

(22) Filed: Nov. 21, 2006

(65) Prior Publication Data
US 2007/0262224 A1    Nov. 15, 2007

(30) Foreign Application Priority Data
May 11, 2006    (TW)    ............... 95208058 U

(51) Int. Cl.
*E04G 3/00*    (2006.01)
(52) U.S. Cl. .............. 248/292.12; 248/284.1; 248/291.1; 248/917; 248/923; 248/282.1; 248/283.1
(58) Field of Classification Search .............. 248/284.1, 248/291.1, 292.12, 917, 923, 282.1, 283.1
See application file for complete search history.

(56) References Cited

U.S. PATENT DOCUMENTS

| | | | | |
|---|---|---|---|---|
| 5,812,368 A | * | 9/1998 | Chen et al. .............. | 361/681 |
| 5,913,351 A | * | 6/1999 | Miura .................. | 16/340 |
| 6,018,847 A | * | 2/2000 | Lu .................... | 16/337 |
| 6,618,903 B2 | * | 9/2003 | Kim ................... | 16/337 |
| 6,672,553 B1 | * | 1/2004 | Lin .................... | 248/276.1 |
| 6,695,274 B1 | * | 2/2004 | Chiu ................... | 248/371 |
| 6,769,657 B1 | * | 8/2004 | Huang .................. | 248/278.1 |
| 7,147,191 B2 | * | 12/2006 | Ichikawa et al. ......... | 248/292.12 |
| 7,177,144 B2 | * | 2/2007 | Ha et al. ............... | 361/681 |
| 7,257,861 B2 | * | 8/2007 | Lee et al. .............. | 16/338 |
| 2006/0032998 A1 | * | 2/2006 | Depay ................. | 248/291.1 |

\* cited by examiner

Primary Examiner—Ramon O. Ramirez
Assistant Examiner—Michael McDuffie
(74) Attorney, Agent, or Firm—Troxell Law Office, PLLC

(57) ABSTRACT

An axle mechanism capable of adjusting an elevation includes a support member, a lower hinge device at the bottom of the support member, an upper hinge device at the top of the support member, and a dual link rod module for connecting the upper and lower hinge devices. If the support member adjusts its elevation and front and rear distance, the turning radius of the dual link rod module is used as a moving range of the support member, such that two sets of pulling plates at the top produce a pushing action and an opposite pulling action to synchronously rotate the shaft rings on both sides of the top and drive the two movable rods to rotate without changing the original angle of the two upper support stands.

9 Claims, 7 Drawing Sheets

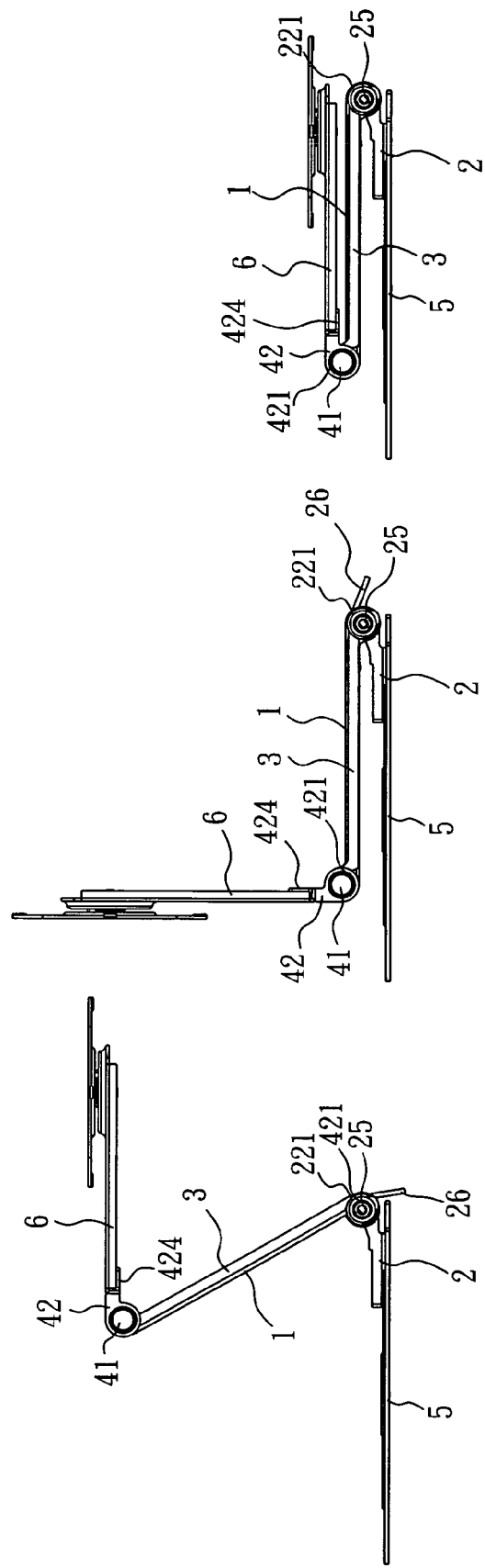

AXLE MECHANISM CAPABLE OF ADJUSTING AN ELEVATION

BACKGROUND OF THE INVENTION

1. Field of the Invention

The present invention relates to an axle mechanism, and more particularly to an axle mechanism with the top and bottom of a support member connected to a upper hinge device and a lower hinge device respectively, and the upper and lower hinge devices are connected by a dual link rod module for maintaining the original angle of the support member unchanged, when a user adjusts the elevation and the front and rear distance of the upper hinge device.

2. Description of the Related Art

As a display device such as an LCD or a plasma TV usually features light, thin and radiation free advantages, and thus such display devices gradually replace the traditional cathode ray tube (CRT) monitors. Since LCD and plasma display devices come with a restricted viewing angle, therefore at least one axle is generally installed at a base of the display device, such that the display device can have the function of adjusting the angle of elevation with respect to the base of the display device.

However, such method cannot provide the function of elevating a flat panel display or moving it back and forth, and thus manufacturers developed a four-linking rod structure, wherein the axle mechanism includes two parallel link rods disposed separately on both sides of the axle mechanism, and each link rod has a hinge disposed on each side for changing the distance between the two link rods to adjust the elevation, since the size of the link rod is fixed. Therefore, a supported object such as a flat panel display can maintain the original angle during the moving process. However, the shortcomings of the axle mechanism with four link rods resides on that there are too many pivotal connecting positions, and the transmission of moment of force is in an N-shape, and thus losses and damages are inevitable. Since the axle mechanism with four link rods of this short has more pivotal connecting points and a complicated structure, the level of difficulty for the assembling process is increased and the manufacturing cost remains very high.

Based on the foregoing shortcomings of the axle mechanism with four link rods, the inventor of the present invention developed a "Turning and elevating axle mechanism" as disclosed in R.O.C. Pat. No. M263727, and such axle mechanism comprises a support member, a lower frame disposed at the bottom between two axle boards of the support member, two corresponding lower axles installed at the bottom of the support member, an upper frame disposed at the top between the two axle plates of the support member, two corresponding upper axles installed at the top of the support member, and two pulling plates disposed on external sides of the two axle boards which are comprised of two pulling plates. The lower frame and upper frame of the invention are integrally installed at an axle mechanism, and such components become necessary components. However, different manufacturers design flat panel displays and bases with different specifications, and some of the components cannot be shared.

SUMMARY OF THE INVENTION

In view of the foregoing shortcomings of the prior art, the inventor of the present invention based on years of experience in the related industry to conduct extensive experiments and modification, in hope of overcoming the shortcomings of the complicated structure of the aforementioned axle mechanism with four link rods and the existing components of the axle mechanism being unable to be shared, and finally developed an axle mechanism capable of adjusting an elevation.

To achieve the foregoing objective, the present invention provides an axle mechanism capable of adjusting an elevation that comprises: a support member, being a rectangular board, a board stand protruded from upper and lower portion on both sides of the support member, and each board stand has a circular axle hole; a lower hinge device, installed at the bottom of the support member by two axles, and its fixing rod is passed through a lower axle hole, three transversally arranged shaft rings, a vertical stand ring of a lower support stand, at least one resilient member, and coupled to the fixing rod by an end plug, such that the support member can produce a turning, a retardation, and a positioning with respect to the two lower support stands; an upper hinge device, installed at the top of the support member by two axles, and its movable rod is passed through a vertical base ring of an upper support stand, three transversally arranged shaft rings, an upper axle hole, at least one resilient member, and coupled to the movable rod by an end plug, such that the two upper support stands can produce a turning, a retardation, and a positioning with respect to the support member; a dual link rod module, with each link rod module installed at the external side of the support member, and each link rod module has two parallel pulling plates, a bent section and a straight section disposed at opposite diagonal corners of the two pulling plates, an axle bolt extended transversally from each section, and included by three shaft rings at the upper and lower ends and coupled to the ring holes along the radial direction of the shaft rings, and a relay bolt pivotally coupled to each adjacent ring hole between every two shaft rings that are not pivotally coupled, a fixing rod and a movable rod respectively passed through the upper and lower shaft rings; such that when the support member is adjusted for its elevation or front or back distance, the turning radius of the dual link rod module is used as the moving range of the support member, such that the two sets of pulling plates at the top produce a pushing action and an opposite pulling action, and the shaft rings on both sides of the top will be rotated synchronously to drive the movable rod to turn without changing the original angle of the two upper support stands.

The secondary objective of the present invention is to provide an axle mechanism capable of adjusting an elevation, wherein the axle hole receives an axle sheathe and includes a frictional plate at the external side of the axle hole. Further, the support member has an embedding tenon protruded from an external periphery of a frictional plate disposed above the axle hole for latching a tenon groove at its periphery. In addition, a frictional plate is disposed between the vertical base ring of the upper support stand and the shaft rings, and a base groove disposed around the base ring of the upper support stand for embedding and positioning an embedding tenon protruded from the periphery of the frictional plate.

Another objective of the present invention is to provide an axle mechanism capable of adjusting an elevation, wherein the fixing rod is installed separately, and an axle rod with a shiny metal surface is extended separately from both sides of its central rod cylinder, and a torsion spring is sheathed into the rod cylinder with a wire end pressing against a stopping member protruded from the support member and another wire end pressing against a fixing object.

A further objective of the present invention is to provide an axle mechanism capable of adjusting an elevation, wherein the support member has an arc guide groove disposed at the periphery of the bottom of two board stands for containing a tenon next to the periphery of the shaft rings to define the swinging angle of the support member.

Another further objective of the present invention is to provide an axle mechanism capable of adjusting an elevation, wherein the stand ring of the lower support stand has a shaft ring installed at the internal side of the shaft ring for receiving at least one embedding tenon which is inserted into a corresponding hole of the stand ring.

Another objective of the present invention is to provide an axle mechanism capable of adjusting an elevation, wherein the base ring of the upper support stand includes a limit groove at its internal side, for containing a latch tenon protruded from a periphery of a shaft ring for limiting the adjustment of the angle of elevation of the two upper support stands.

A further objective of the present invention is to provide an axle mechanism capable of adjusting an elevation, wherein a latch ring and a connecting ring latched to the base ring are connected in series between the movable rod and the upper support stand, and the latch ring has two corresponding latch grooves, such that when a force is applied to the two upper support stands for a rotation, the two circular tenons of the connecting ring are passed through a stopping edge of the latch groove and moved along its arc edge until it is latched into another latch groove, and the two upper support stands will be parallel to the two lower support stands, Now, an external force is applied to the support member to drive it to descend, so as to shorten the distance of the two upper support stands from the two lower support stands.

BRIEF DESCRIPTION OF THE DRAWINGS

The objectives, shape, structure, apparatus, characteristics and effects will become apparent by the detail description together with the accompanying drawings as follows:

FIGS. 7a to 7c are schematic views of folding an axle mechanism inward in accordance with the present invention.

DETAILED DESCRIPTION OF THE PREFERRED EMBODIMENTS

Figure 1:
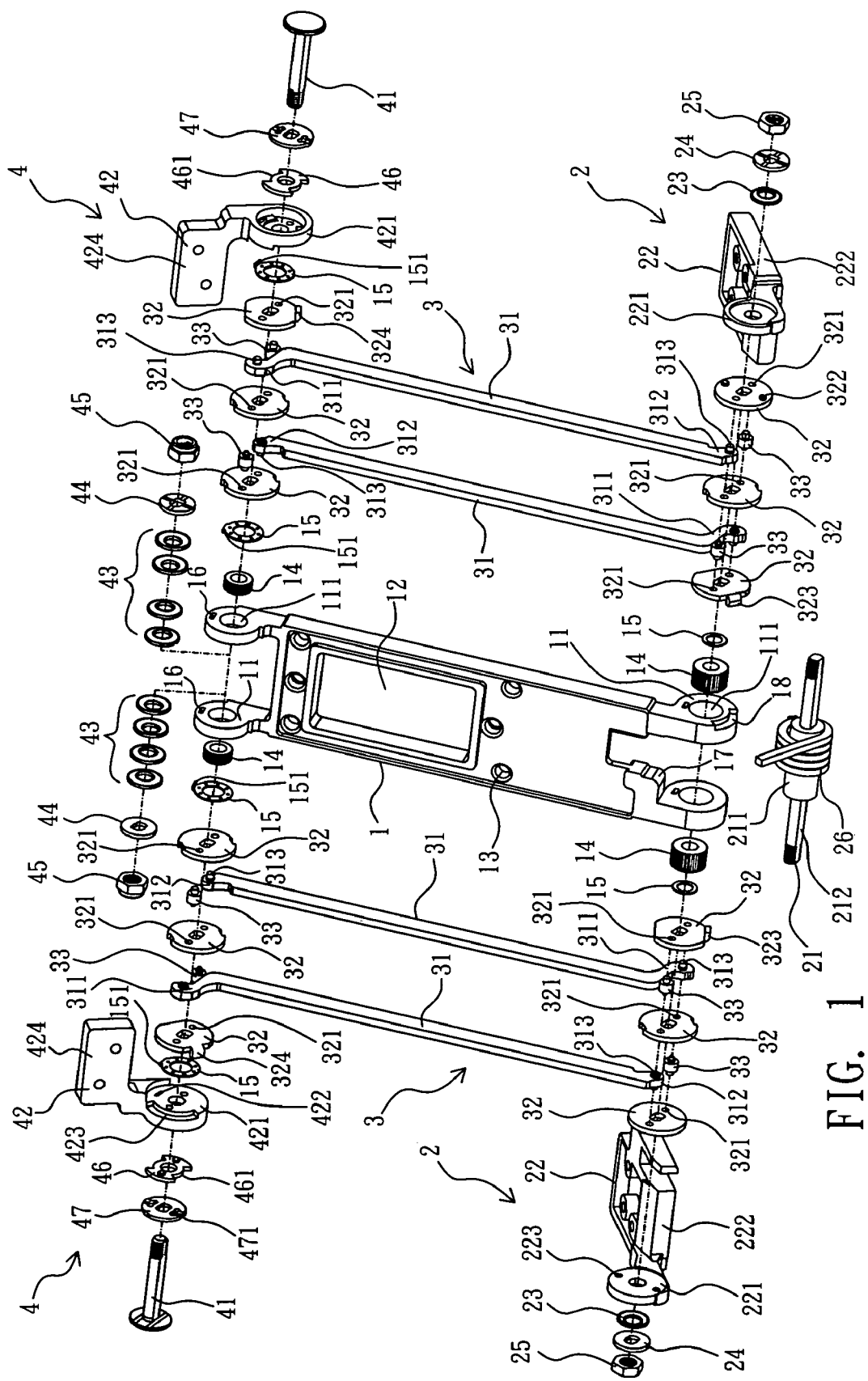
FIG. 1 is an exploded view of an axle mechanism in accordance with the present invention.
Figure 2A:
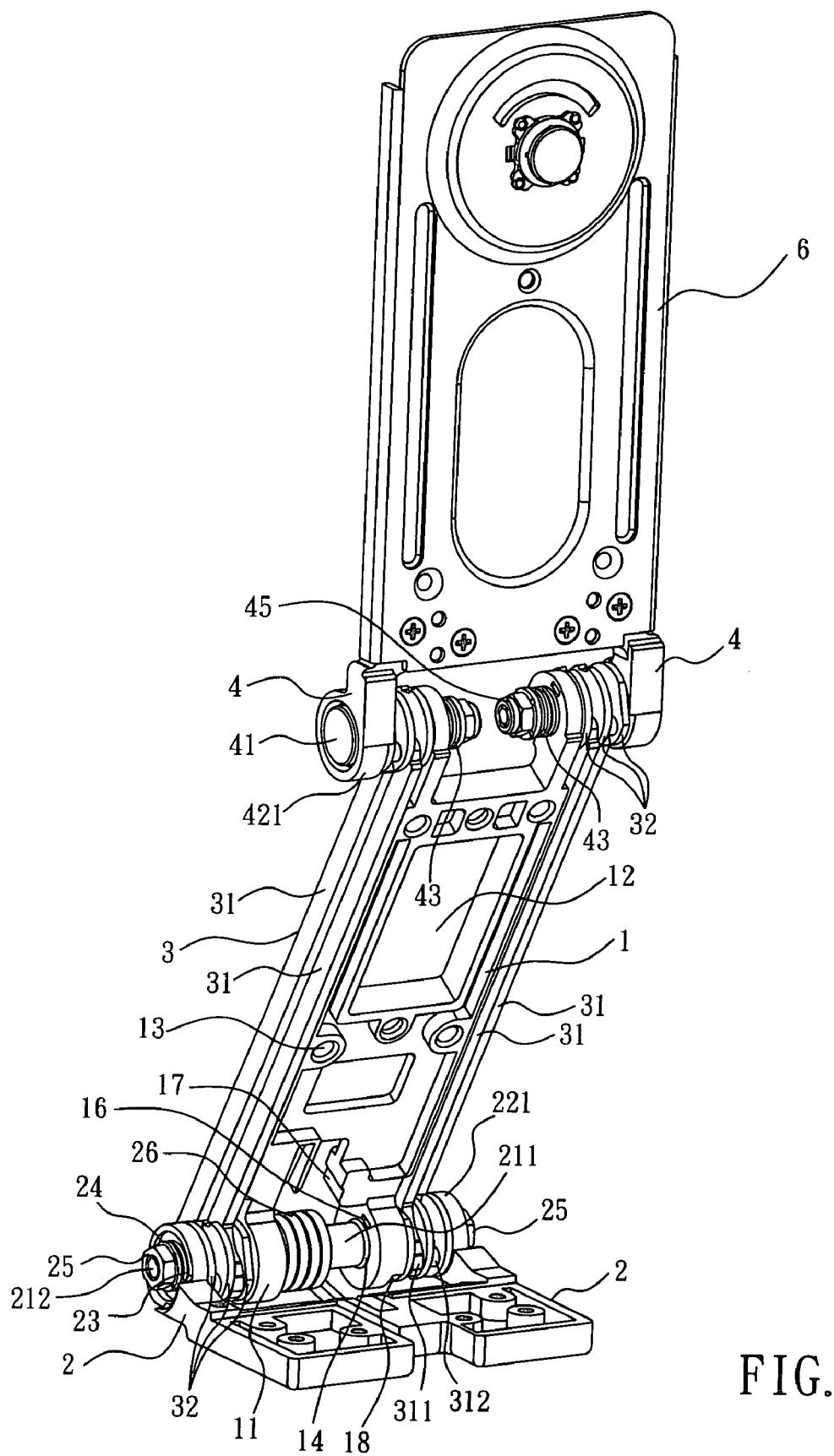
FIGS. 2a and 2b are two perspective views of the present invention shown at two different viewing angles.
Figure 2B:
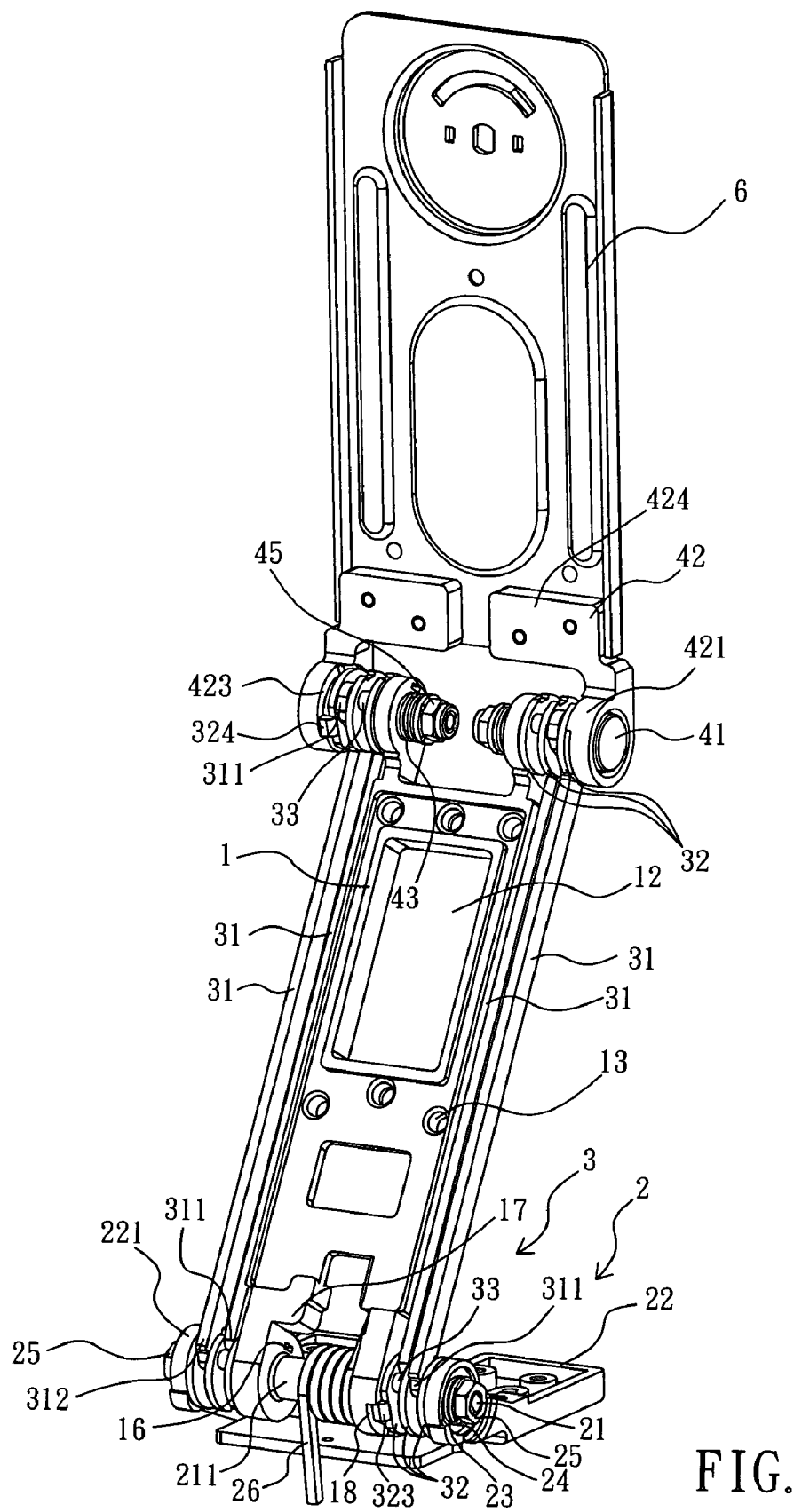

Referring to FIGS. 1 to 5, an axle mechanism of the invention comprises a support member 1, a lower hinge device 2, a dual link rod module 3, and an upper hinge device 4.

The support member 1 is a rectangular board having a board stand 11 protruded separately from the bottom and top of both left and right sides of the support member 1, and an axle hole 111 disposed thereon for connecting a lower hinge device 2 and an upper hinge device 4 as shown in the figure, and the support member 1 has a hollow groove 12 to save materials, and the surface of the board has a plurality of connecting holes 13 for connecting the covering element such as an external hood and covering the components such as the support member 1 and the two hinges 2, 4. To lower the manufacturing cost, the support member 1 of the invention is made of an aluminum alloy to improve its wear-resisting effect, and each axle hole 111 is provided for receiving an axle sheathe 14 and has an internal frictional plate 15 disposed on an external side of the axle sheathe 14 for producing frictions between the lower hinge device 2 and the upper hinge device 4, wherein an embedding tenon 151 is protruded from a periphery of the frictional plate 15 at an external side of the upper axle hole 111 and latched into a tenon groove 16 around the upper axle hole 111.

Figure 3:
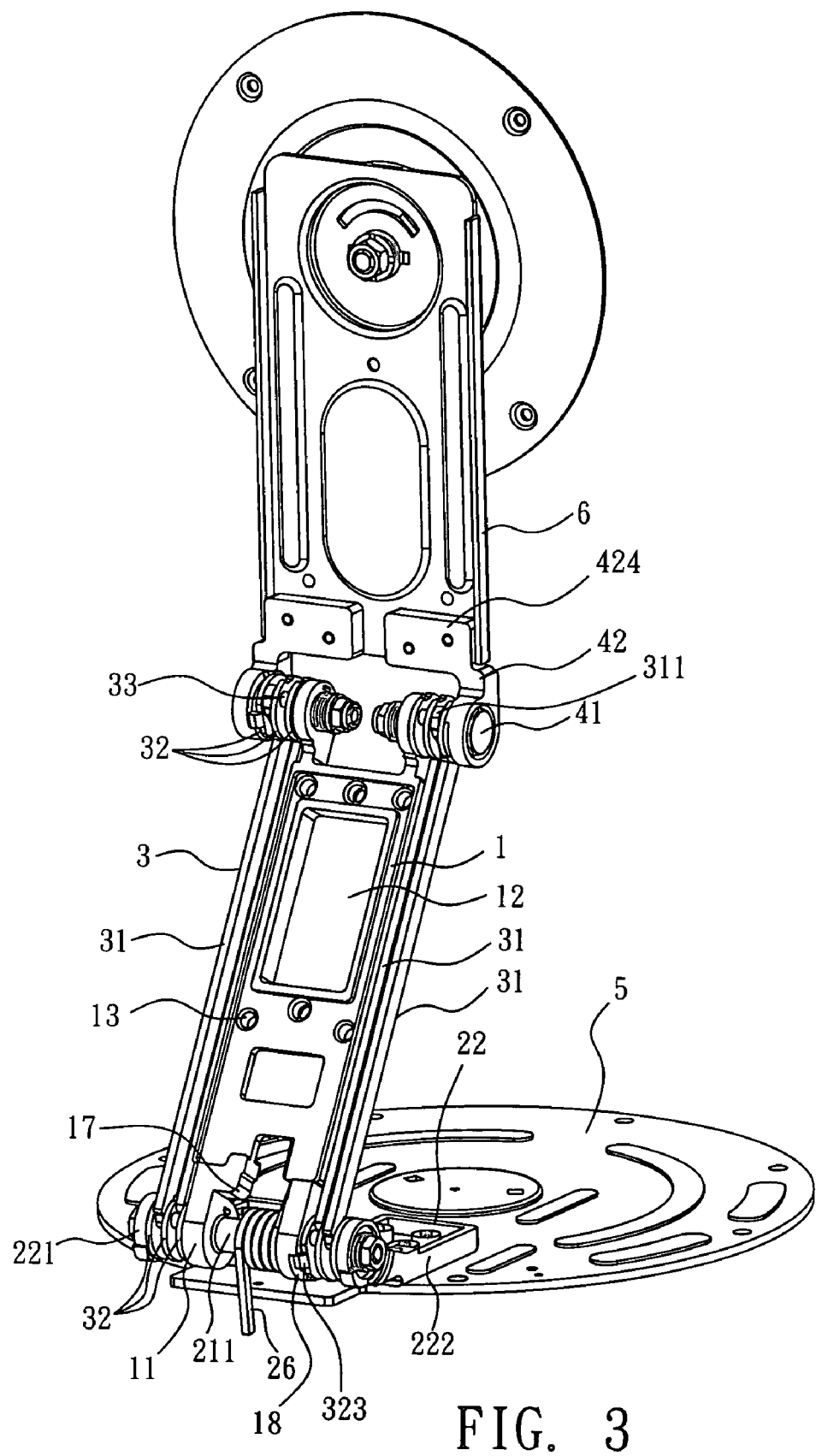
FIG. 3 is a perspective view of a lower frame and an upper frame connected with each other in accordance with the present invention.
Figure 4:
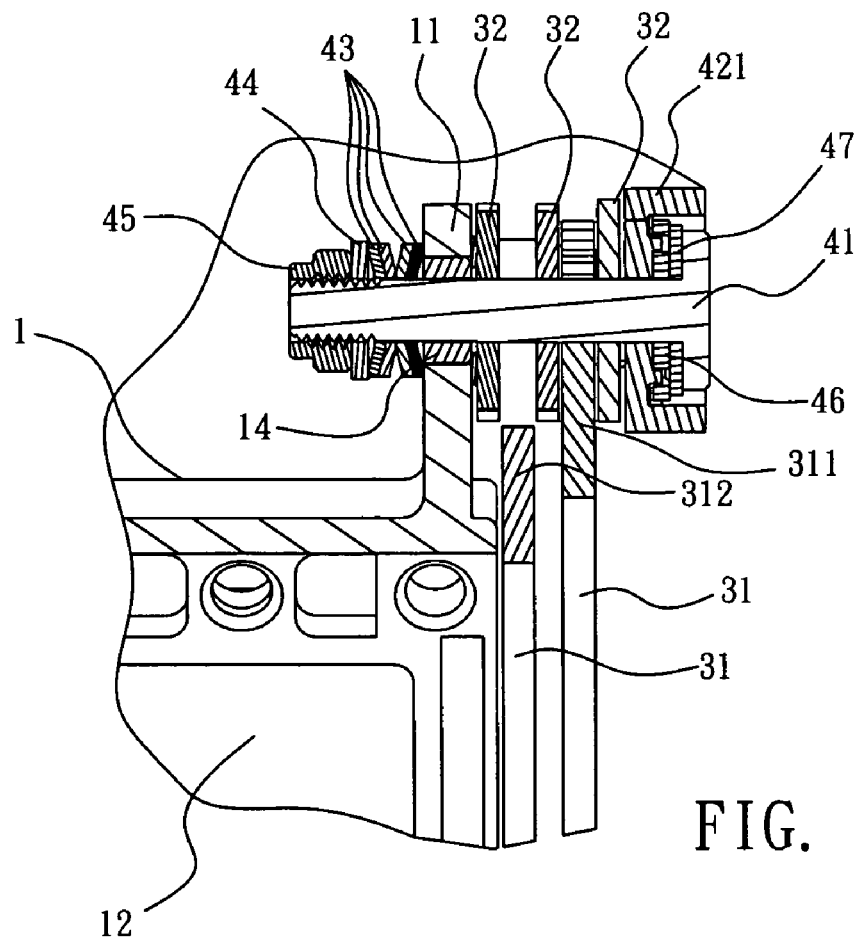
FIG. 4 is a cross-sectional view of an installed upper hinge device in accordance with the present invention.
Figure 5:
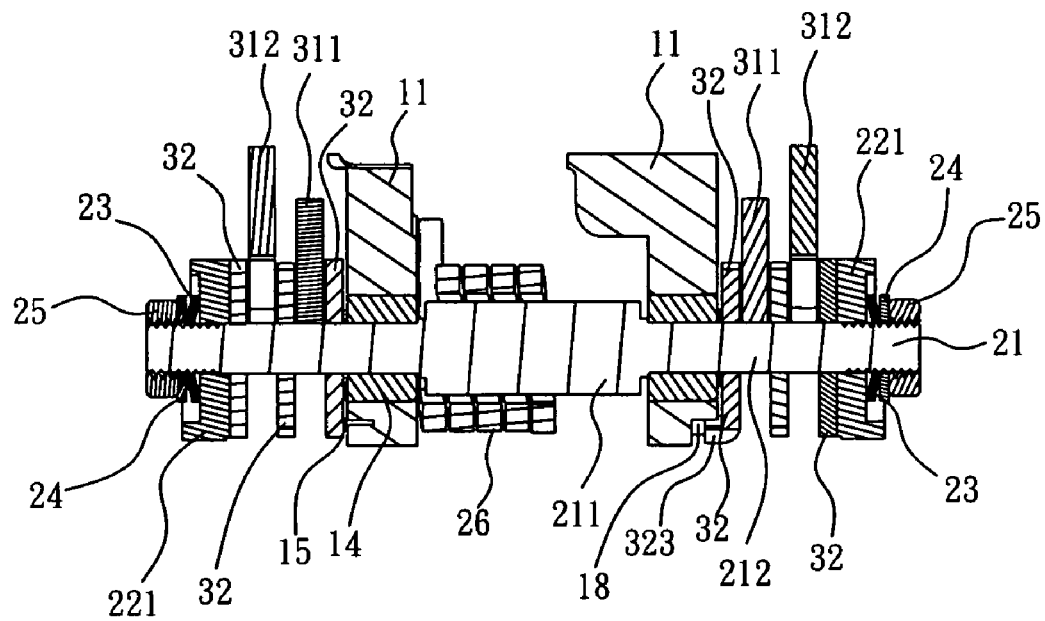
FIG. 5 is a cross-sectional view of an installed lower hinge device in accordance with the present invention.

The lower hinge device 2 is installed at the bottom of the support member 1 by the two axles, and passing through an axle sheathe 14, an internal frictional plate 15, three transversally arranged shaft rings 32, a vertical stand ring 221 of a lower support stand 22, at least one resilient member 23, and a spacer 24 sequentially by both ends of a fixing rod 21, and coupled to the fixing rod 21 by an end plug 25 such as a screw cap for pressing against the foregoing components, so that the two lower support stands 22 produce a turning, a retardation or a positioning with respect to the support member 1. A separate fixing rod 21 can be installed, and its central rod cylinder 211 has an axle rod 212 with a shiny metal surface extended from both sides of the central rod cylinder 211 and a torsion spring 26 connected to the position of the rod cylinder 211. A wire end of the torsion spring 26 is compressed at a stopping member 17 disposed at the bottom of the support member 1 and another wire end is compressed at a fixing object 5 as shown in FIG. 3, such that when the support member 1 is turned downward, the torsion spring 26 binds up the rod cylinder 211. The advantage of the present invention for installing two lower support stands 22 resides on that a traditional connecting member such as a screw can be connected to the fixing object 5 such as a lower frame by a horizontal connecting portion 222 which can be made in any shape or specification according to customer requirements, and thus it can reduce the inventory of the bases. Further, the fixing rod 21 is not limited to such arrangement, and two symmetrical fixing rods 21 can be installed.

Since the fixing rod 21, the plurality of shaft rings 32 and the stand ring 221 are fixed, a friction is produced between the frictional plate 15 in the internal shaft rings 32 and the board stand 11, such that the support member 1 can be turned with respect to the two lower support stands 2. Both end portions of the torsion spring 26 press against the stopping member 17 extended inward from the support member 1 and the fixing object 5 such as a lower frame, so that a tenon 323 protruded from the periphery of the internal shaft rings 32 constantly presses against the top of an arc guide groove 18 disposed around the axle hole 11, and an inclination is formed at the two lower support stands 22. Further, the external shaft ring 32 is fixed at the internal side of the stand ring 221. For example, at least one embedding tenon 322 is inserted into a corresponding connecting hole 223 of the stand ring 221, so that the shaft ring 32 is fixed at the lower support stand 22.

The dual link rod module 3 is installed on an external side of said support member 1, and each link rod module 3 is comprised of two parallel pulling plates 31. To arrange the two pulling plates 31 parallel to each other on both left and right sides, a bent section 311 and a straight section 312 are disposed at opposite diagonal corners of the two pulling plates 31, and an axle bolt 313 is extended transversally from each section to facilitate the connection of the plurality of shaft rings 32 at the top and the bottom. As shown in the figures, the top and bottom of the two pulling plates 31 are included by three upper and lower shaft rings 32, and a ring hole 321 is disposed separately at both ends along the radial direction of the shaft rings 32 for inserting the axle bolts 313 corresponding to a bent section 311 and a straight section 312 to define a better connection, and a relay bolt 33 which is not pivotally coupled between the two shaft rings 32 is pivotally coupled to the adjacent ring hole 321 as shown in the figure. For example, the two rows of three ring holes 321 corresponding to the three shaft rings 32 at the bottom are connected in sequence by a relay bolt 33, an axle bolt 313 of the straight section 312 under an external pull plate 31, an axle bolt 313 disposed at a bent section under an internal pull plate 31, and a relay bolt 33, such that the upper and lower ends of the two pulling plates 31 are pivotally coupled to the upper and lower ends of the three shaft rings 32. Further, the shaft ring 32 has a long circular hole disposed along the axial direction and passed through by a fixing rod 21 and a movable rod 41.

The upper hinge device 4 is installed to the top of the support member 1 by two axles, and a movable rod 41 disposed separately on both sides passes through a vertical base ring 421 of an upper support stand 42, an external frictional plate 15, three transversally arranged shaft rings 32, an internal frictional plate 15, an axle sheathe 14, at least one resilient member 43, and a spacer 44, and coupled to a movable rod 41 by an end plug 45 such as a screw cap and compressing the foregoing elements, and two upper support stands 42 can produce a turning, a retardation or a positioning effect with respect to the support member 1. The resilient members 23, 43 of the embodiment are disc spring plates, wavy spring plates or springs.

An embedding tenon 151 is extended from the external frictional plate 15 and latched and positioned to a base groove 422 that is disposed around the base ring 421. Further, the two upper support stands 42 have a limit groove 423 disposed at an internal side of the upper support stand 42 for containing a latch tenon 324 protruded from the periphery of the external shaft ring 32 at the top for limiting the adjustment of angle of elevation of the two upper support stands 42. Further, the connecting portion 424 of the two upper support stands 42 is coupled to a moving object 6 by a traditional connecting member such as a screw as shown in FIG. 3, such that the upper frame is installed to a supported object such as a flat panel display, and the gravitational force of the supported object presses against a lower edge of the limit groove 423 to be turned slightly downward. By the friction produced among the upper support stand 42, external frictional plate 15, external shaft ring 32, internal shaft rings 32, internal frictional plate 15 and board stand 11, the moving object 5 together with the supported object have the function of adjusting the angle of elevation. The advantage of the present invention resides on that the two upper support stands 42 of the present invention can be connected to a moving object 6 such as an upper frame in any form or specification according to customer requirements, so as to reduce the inventory of the upper frame.

Further, a latch ring 46 and a connecting ring 47 latched to a base ring 421 can be connected sequentially between the movable rod 41 and the upper support stand 42, and the latch ring 46 has two pairs of corresponding latch groove 461. When the two upper support stands 42 rotate with the movable member 6, the two circular tenons 471 of the connecting ring 47 pass through a stopping edge of the latch groove 461 and move along its arc edge until the two circular tenons are latched into another latch groove 461, such that the moving object 6 is parallel to the fixing object 5 as shown in FIG. 7a. If an external force is applied, the support member 1 will be descended as shown in FIG. 7b, and then the moving object 5 is adjusted as shown in FIG. 7c to shorten the distance between the moving object 6 and the fixing object 5 greatly, so as to reduce the material volume, facilitate the packaging, and lower the transportation cost.

Figures 6A, 6B, 6C:
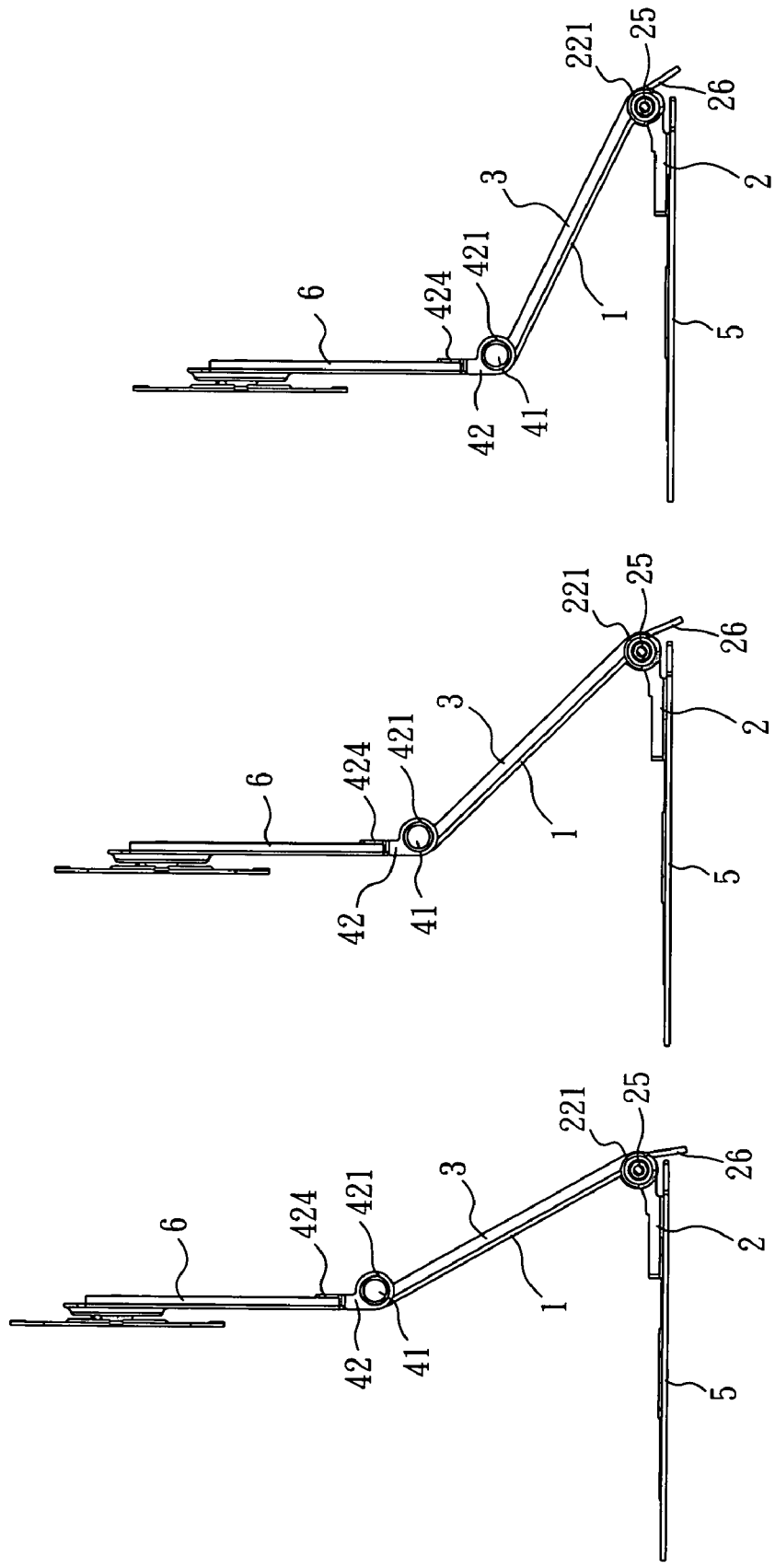
FIGS. 6a to 6c are schematic views of adjusting the elevation of an axle mechanism in accordance with the present invention.

Referring to FIGS. 6a to 6c, the support member 1 uses the lower hinge device 2 as an axle center for its rotation, when the moving object 5 is elevated. Since the dual link rod module 3 has limited the turning radius at the top of the support member 1, and thus the two pairs of parallel pulling plates 31 produce a pushing action and a pulling action during their rotations, such that the three shaft rings 32 at the top rotate synchronously as well to drive the movable rod 41 to turn without affecting the original angle of the moving object 6, because the hole of the base ring 421 is a circular hole. In other words, the two upper support stands 42 will not be rotated according to the movable rod 41 without changing the original angle.

In the preferred embodiment of the present invention, a dual link rod module comes with a fixed size, and an end is fixed to a lower hinge device, and the other end is pivotally coupled to the upper hinge device. After the elevation and front and rear position is adjusted, the turning radius of a dual link rod module is used for a moving range of the support member, such as the two sets of pulling plates at the top produce a pushing action and a pulling action, and drives the three shaft rings to rotate synchronously, and drives the two movable rods to turn without affecting the original angle of the two upper support stands. Further, a latch ring and a connecting ring of the base ring are connected sequentially between the movable rod and the upper support stand. For counter clockwise rotations, two circular tenons of the connecting ring are latched and fixed into a pair of latch grooves, and the two upper support stands are then parallel to the two lower support stands. If an external force is applied, the support member will be descended, so as to greatly shorten the distance between the two and facilitate the packaging and transportation.

While the invention has been described by means of a specific numerous modifications and variations could be made thereto by those skilled in the art without departing from the scope and spirit of he invention set forth in the claims.

In summation of the above description, the present invention definitely achieves the expected objective to enhance the performance over the prior art. The invention further complies with the patent application requirements and is duly filed for the patent application.

What is claimed is:

1. An axle mechanism capable of adjusting an elevation, comprising:

a support member, being a rectangular board and having a board stand protruded from upper and lower portions on both sides of said support member, and said each board stand having a circular axle hole;

a lower hinge device, installed at the bottom of said support member by two axles and having a fixing rod passing through a lower axle hole, three transversally arranged shaft rings, a vertical stand ring of a lower support stand, at least one resilient member and coupled to said fixing rod by an end plug, such that said support member produces a turning, a retardation and a positioning with respect to two lower support stands;

an upper hinge device, installed at the top of said support member by two axles and having a movable rod passing through a vertical base ring of an upper support stand, three transversally arranged shaft rings, an upper axle hole, and at least one resilient member, and coupled to said movable rod by an end plug, such that said two upper support stands can produce a turning, a retardation or a positioning with respect to said support member;

a dual link rod module, disposed on an external side of said support member and said each link rod module having two parallel pulling plates, and said two pulling plates having a bent section and a straight section disposed at opposite diagonal corners respectively, an axle bolt transversally extended from said each section and included by three shaft rings at the top and bottom and correspondingly coupled to ring holes disposed along the radial direction of said shaft rings, and a relay bolt which is not pivotally coupled between said two shaft rings pivotally coupled to said adjacent ring holes, and said shaft rings at the top and bottom being passed through by a fixing rod and a movable rod;

such that when said support member is adjusted for its elevation and front and back distance, the turning radius of a dual link rod module is used as a moving range of said support member, and two sets of said pulling plates at the top can produce a pushing action and a pulling action for driving said shaft rings on both sides at the top to rotate synchronously, and driving said two movable rods to turn, without changing the original angle of said two upper stands, wherein said axle hole receives an axle sheathe and has a frictional plate disposed on an external side of said axle hole.

2. The axle mechanism capable of adjusting an elevation of claim 1, further comprising an embedding tenon disposed at the periphery of said frictional plate on the external side of said axle hole at the top of said support member and latched into a tenon groove disposed around its periphery.

3. The axle mechanism capable of adjusting an elevation of claim 1, wherein said fixing rod is installed separately, and its central rod cylinder has an axle rod with a shiny metal surface separately extended from both sides of said central rod cylinder, and a torsion spring sheathed onto a rod cylinder with a wire end compressing at a stopping member protruded from said support member, and another wire end compressing at a fixing object.

4. The axle mechanism capable of adjusting an elevation of claim 1, further comprising a frictional plate disposed between said vertical base rings of said upper support stand and said internal shaft rings.

5. The axle mechanism capable of adjusting an elevation of claim 1, wherein said support member has an arc guide groove disposed at the periphery of said two board stands at the bottom for containing a tenon protruded from an adjacent shaft ring for defining the swinging angle of said support member.

6. The axle mechanism capable of adjusting an elevation of claim 1, wherein said stand ring of said lower support stand installs a shaft ring disposed at an internal side of said stand ring and inserted into a connecting hole corresponding to said stand ring by at least one embedding tenon.

7. The axle mechanism capable of adjusting an elevation of claim 1, wherein said base ring of said upper support stand has a base groove around said base ring, for inserting an embedding tenon protruded from the periphery of a frictional plate.

8. The axle mechanism capable of adjusting an elevation of claim 1, wherein said base ring of said upper support stand has a limit groove disposed on an internal side of said base ring, for containing a latch tenon protruded from the periphery of a shaft ring and limiting the adjustment of angle of elevation of said two upper support stands.

9. The axle mechanism capable of adjusting an elevation of claim 1, wherein said movable rod and said upper support stand include a latch ring and a connecting ring latched with said base ring connected in series between said movable rod and said upper support stand, and said latch ring has two corresponding latch grooves, such that when a force is applied to said two upper support stands to rotate said two upper support stands, two circular tenons of said connecting ring pass through said stopping edge of said latch groove and move along its arc edge, until said two circular tenons are latched into another latch groove, and said two upper support stands are parallel to said two lower support stands, and when an external force is applied to said support member to drive said support member to descend, the distance from said two upper support stands to said two lower support stands can be reduced.

* * * * *